(12) United States Patent
Ichimi

(10) Patent No.: US 9,304,786 B2
(45) Date of Patent: Apr. 5, 2016

(54) INFORMATION PROCESSING APPARATUS, METHOD OF CONTROLLING THE SAME, AND PROGRAM

(75) Inventor: Hideshi Ichimi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 795 days.

(21) Appl. No.: 13/202,821

(22) PCT Filed: Jul. 1, 2011

(86) PCT No.: PCT/JP2011/003775
§ 371 (c)(1),
(2), (4) Date: Aug. 23, 2011

(87) PCT Pub. No.: WO2012/004957
PCT Pub. Date: Jan. 12, 2012

(65) Prior Publication Data
US 2012/0010871 A1   Jan. 12, 2012

(30) Foreign Application Priority Data
Jul. 7, 2010 (JP) .................................. 2010-154957

(51) Int. Cl.
*G06F 17/28* (2006.01)
*G06F 9/44* (2006.01)

(52) U.S. Cl.
CPC .................................... *G06F 9/4448* (2013.01)

(58) Field of Classification Search
CPC ........ G06F 17/27; G06F 17/28; G06F 9/4448
USPC ................................ 704/1–10; 707/706–708
See application file for complete search history.

(56) References Cited

U.S. PATENT DOCUMENTS

| | | | |
|---|---|---|---|
| 5,778,356 A * | 7/1998 | Heiny | |
| 5,944,790 A * | 8/1999 | Levy ................. | G06F 17/30905 707/E17.121 |
| 6,163,785 A * | 12/2000 | Carbonell et al. ............ | 715/236 |
| 6,205,418 B1 * | 3/2001 | Li .......................... | G06F 17/289 704/8 |
| 6,735,759 B1 * | 5/2004 | Yamamoto et al. ........... | 717/136 |
| 7,099,809 B2 * | 8/2006 | Dori .................................. | 703/6 |
| 7,461,078 B2 * | 12/2008 | Vogel | |
| 7,554,679 B2 * | 6/2009 | Une et al. ......................... | 358/1.1 |
| 7,881,923 B2 * | 2/2011 | Fux et al. .......................... | 704/8 |
| 2002/0111933 A1 * | 8/2002 | Noble et al. ...................... | 707/1 |
| 2003/0046059 A1 * | 3/2003 | Litster et al. ..................... | 704/8 |
| 2003/0101178 A1 * | 5/2003 | Miyata et al. .................... | 707/6 |
| 2003/0125972 A1 * | 7/2003 | Luce et al. ........................ | 705/1 |

(Continued)

FOREIGN PATENT DOCUMENTS

| | | |
|---|---|---|
| JP | 9251457 A | 9/1997 |
| JP | 2001-142600 A | 5/2001 |

(Continued)

*Primary Examiner* — Lamont Spooner
(74) *Attorney, Agent, or Firm* — Canon USA Inc. IP Division

(57) ABSTRACT

An information processing apparatus includes a display apparatus that is provided with a button that can be used by users of different native language-types with names that are registered as character strings in language-types displayable on the display apparatus. Accordingly, when a user switches language-types to be displayed, the button is displayed with a name as a character string in the switched language-type among the registered character strings, which allows users of different native language-types to understand the button name, thus enhancing the usability of the apparatus.

10 Claims, 15 Drawing Sheets

(56) References Cited

U.S. PATENT DOCUMENTS

| | | | |
|---|---|---|---|
| 2005/0013207 A1* | 1/2005 | Tsumagari et al. | 369/14 |
| 2005/0171784 A1* | 8/2005 | Fukushima et al. | 704/277 |
| 2005/0264830 A1* | 12/2005 | Une et al. | 358/1.1 |
| 2006/0227343 A1* | 10/2006 | Yamaguchi | 358/1.1 |
| 2007/0136266 A1* | 6/2007 | Su et al. | 707/4 |
| 2007/0150258 A1* | 6/2007 | Lister et al. | 704/2 |
| 2007/0288853 A1* | 12/2007 | Neil | G06F 9/4448 715/760 |
| 2008/0059877 A1* | 3/2008 | Brookler | G06F 9/4448 715/264 |
| 2008/0077384 A1* | 3/2008 | Agapi et al. | 704/2 |
| 2008/0127091 A1* | 5/2008 | Ericsson et al. | 717/123 |
| 2008/0174485 A1* | 7/2008 | Carani et al. | 342/357.07 |
| 2008/0294424 A1* | 11/2008 | Naito et al. | 704/8 |
| 2009/0055764 A1* | 2/2009 | Katsumata | 715/764 |
| 2010/0229095 A1* | 9/2010 | Forstall et al. | 715/733 |
| 2010/0306020 A1* | 12/2010 | Lo | G06Q 10/06 705/7.27 |
| 2010/0306679 A1* | 12/2010 | Wu | 715/760 |
| 2011/0063141 A1* | 3/2011 | Gabay | G06F 3/0238 341/23 |
| 2011/0167375 A1* | 7/2011 | Kocienda | 715/773 |
| 2011/0209071 A1* | 8/2011 | Pearson | H04L 65/403 715/753 |
| 2011/0264714 A1* | 10/2011 | Fourcade et al. | 707/824 |

FOREIGN PATENT DOCUMENTS

| | | |
|---|---|---|
| JP | 2007058632 A | 3/2007 |
| JP | 2008-078902 A | 4/2008 |
| JP | 2008078902 A | 4/2008 |

* cited by examiner

INFORMATION PROCESSING APPARATUS, METHOD OF CONTROLLING THE SAME, AND PROGRAM

TECHNICAL FIELD

The present invention relates to an information processing apparatus equipped with a function to switch language-types of screen displayed on a display apparatus.

BACKGROUND ART

Conventional information processing apparatuses including multi function peripheral (MFP) are provided with a display apparatus having a function to display character strings in different language-types on a screen so that users of different native language-types can operate the apparatuses. Japanese Patent Application Laid-Open No. 2001-142600 discusses an information processing apparatus that stores, in advance, character strings to be displayed in a plurality of different language-types. When a user instructs switching of a language-type to a specified one, the apparatus retrieves and reads character strings in the specified language-type, and displays the read character strings on the operation screen of an operation panel.

Meanwhile, display apparatuses are known, which are provided with a function to register objects (e.g., buttons arranged on operation screen) to be included in an operation screen according to instruction from user. Examples of the buttons include a shortcut button to bookmark a website to enable a web browser to access the website, a favorite button to register a setting that is frequently used in an application. Such shortcut button and favorite button can be given a name individually by a user.

When a user registers an object and switches language-types, sometimes the character string (e.g., button name) registered in association with an object is not displayed properly or gets garbled. To avoid such trouble, Japanese Patent Application Laid-Open No. 2008-078902 discusses a display apparatus in which button names registered according to instruction from user are controlled not to be switched between language-types.

CITATION LIST

Patent Literature

PTL 1: Japanese Patent Application Laid-Open No. 2001-142600
PTL 2: Japanese Patent Application Laid-Open No. 2008-078902

SUMMARY OF INVENTION

The present invention enables realization of an information processing apparatus equipped with a function to display character string understandable to both a user who instructs registration of an object and a user who does not know the first language-type.

According to an aspect of the present invention, an information processing apparatus includes a display unit configured to display an operation screen displayable in multiple language-types; a registration unit configured to register a name of a button according to an instruction of a user through the operation screen displayed by the display unit, in language-types displayable on the display unit, the button being arranged on the operation screen; a specification unit configured to specify a language-type in which the operation screen is displayed; and a control unit configured to control the display unit such that, when an operation screen is displayed in the language-type specified by the specification unit, a button name registered by the registration unit is displayed on the display unit, the button name corresponding to the language-type specified by the specification unit.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

Figure 1:
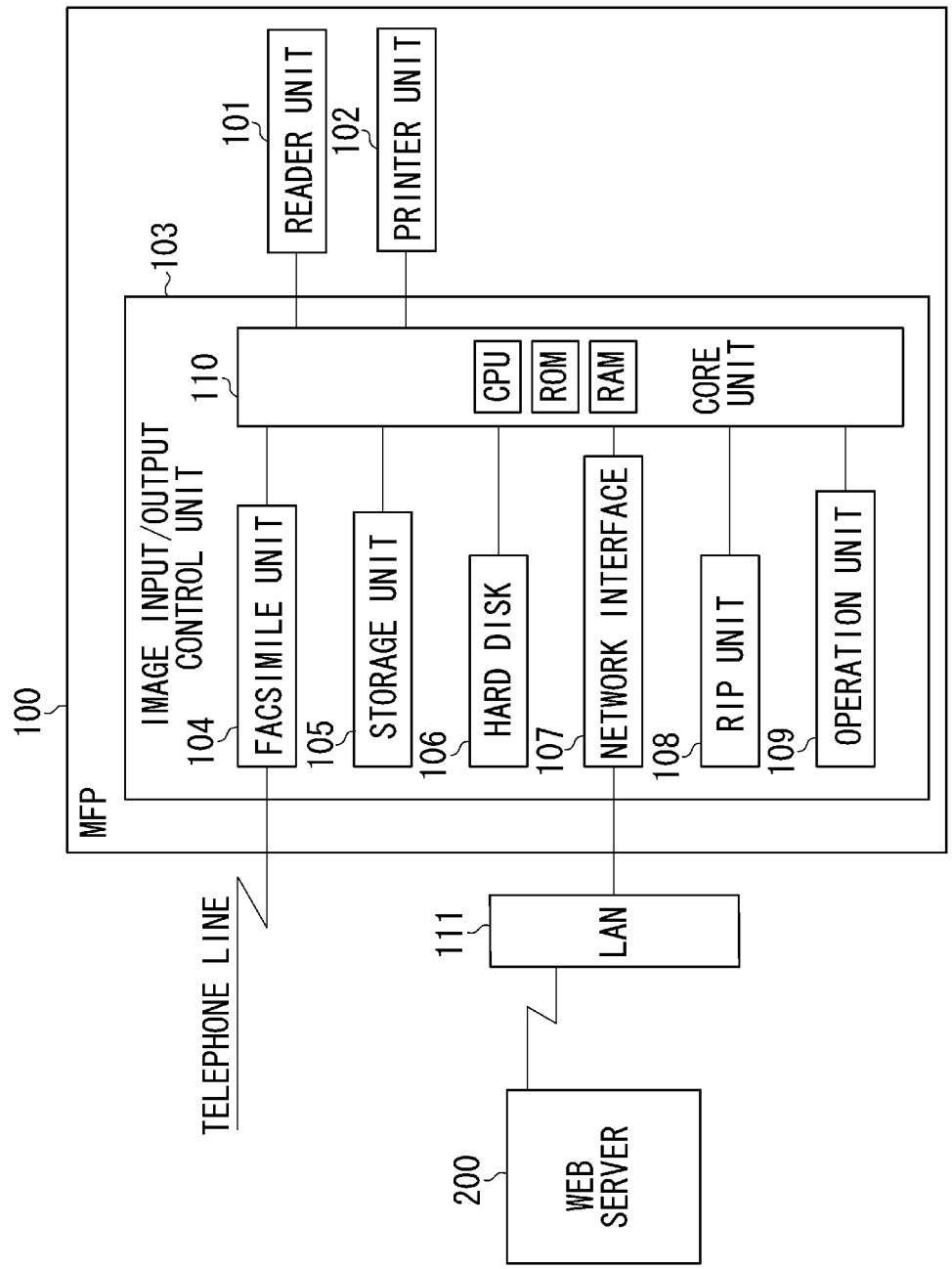
FIG. 1 is a block diagram illustrating a configuration of an information processing system including an information processing apparatus according to an exemplary embodiment of the present invention.

A first exemplary embodiment is described. FIG. 1 is a block diagram illustrating a configuration of an information processing system including an MFP 100. The information processing system in FIG. 1 includes the MFP 100 that is communicably connected to a Web server 200 through a local area network (LAN) 111.

The MFP 100 includes a reader unit 101, a printer unit 102, and an image input/output control unit 103, which are connected to one another. The reader unit 101 reads images on a document, and outputs image data corresponding to the document images to the image input/output control unit 103. The printer unit 102 records images onto recording paper based on the image data output from the image input/output control unit 103. The image input/output control unit 103 includes a facsimile unit 104, a storage unit 105, a network interface 107, a RIP unit 108, an operation unit 109, and a core unit 110.

The facsimile unit 104 decompresses image data received in compressed form through telephone line, and transmits the decompressed image data to the core unit 110. The facsimile unit 104 compresses the image data transmitted from the core unit 110, and transmits the compressed image data through telephone line. The transmitted/received image data can be temporarily stored in a hard disk 106 connected to the storage unit 105.

The storage unit 105 compresses the image data transmitted from the core unit 110, and stores the data in the hard disk 106 in association with corresponding ID numbers to be used to retrieve the image data. The storage unit 105 further retrieves compressed image data stored in the hard disk 106 based on code data transmitted through the core unit 110, reads and decompresses the retrieved compressed image data, and transmits the decompressed image data to the core unit 110.

The network interface 107 is an interface between the LAN 111 and the core unit 110.

The RIP unit 108 develops the code data (page description language (PDL) data) transmitted from the LAN 111 to image data that can be recorded in the printer unit 102.

The operation unit 109 includes a touch panel display and hard keys. The operation unit 109 instructs and sets operations to be performed by the MFP 100 according to operations input through hard keys or the key board displayed on the touch panel display, and displays character strings stored in the MFP 100 on the touch panel display.

The core unit 110 includes a central processing unit (CPU), a read only memory (ROM), and a random access memory (RAM), and controls data flow between the reader unit 101, the printer unit 102, the facsimile unit 104, the storage unit 105, the network interface 107, the RIP unit 108, and the operation unit 109. The CPU executes programs stored on the ROM, to control the entire MFP 100.

The Web server 200 is accessed from the operation unit 109 through the LAN 111, and returns a respond to a request for a Web page from the MFP 100.

The MFP 100 is an example of an information processing apparatus having a display apparatus. Other examples include electronic apparatuses such as personal computers, peripheral devices including printers and facsimiles, and mobile phone terminals.

Figure 2:
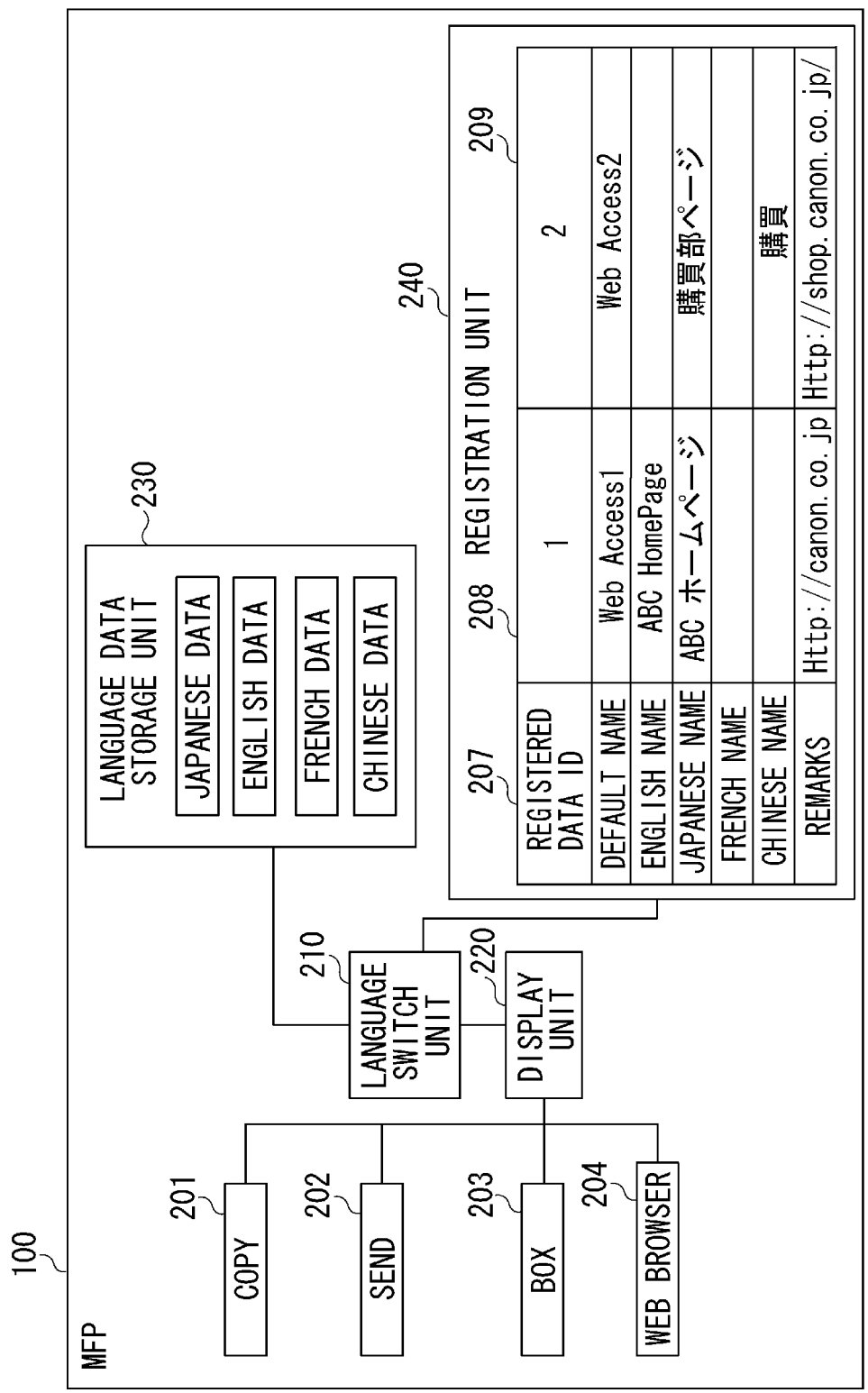
FIG. 2 is a block diagram illustrating a configuration of a display unit in an information processing apparatus of the present invention.

A software configuration of the MFP 100 is described with reference to FIG. 2. FIG. 2 illustrates blocks operated by the CPU, ROM, and RAM in the core unit 110. These blocks in FIG. 2 each schematically illustrate a program stored on the ROM in the core unit 110. The CPU loads the programs stored on the ROM to the RAM, and executes them. The programs may be stored on a hard disk drive (HDD) or solid state disk drive (SDD). The core unit 110 may include one or more CPUs.

The MFP 100 contains a plurality of applications such as Copy 201, Send 202, Box 203, and Web browser 204. These applications each provide a user interface to operate a corresponding application.

For example, the Copy 201 displays a user interface on the operation unit 109 to enable settings for image reading and image printing. The Copy 201 accepts registration of a setting that is frequently used, as a favorite button. The favorite button is one example of objects on a screen displayed by the display unit 220.

The Send 202 is an application to transmit image data obtained by scanning using the reader unit 101 to a specified destination address, and displays a user interface on the operation unit 109 to enable registration of the destination address as an address book. The Send 202 accepts registration of the address book, which is an example of objects.

The Box 203 separates a storage region in the hard disk 106 as a region called box, so that images transmitted from a personal computer (PC) (not illustrated) and converted to bitmap data from PDL data can be temporarily stored in the box. A user also can register a new box. The box in the present exemplary embodiment is one example of objects arranged on a screen displayed by the display unit 220.

The Web browser 204 displays a Web page based on the content located on the Web server 200 connected to the LAN 111. The Web browser 204 can assign a uniform resource locator (URL) to a shortcut button in advance and register the shortcut button to directly access a specified website, and display the registered shortcut button on a screen of the operation unit 109. The shortcut button is one example of objects arranged on a screen displayed by the display unit 220.

The language-type switch unit 210 obtains character strings stored in the language data storage unit 230 (first character strings) and character strings registered by the registration unit 240 (second character strings), and controls the display unit 220 to display the strings.

The language data storage unit 230 stores the character strings (first character strings) displayed on the screen of the operation unit 109 in association with IDs. For example, the language data storage unit 230 stores the character strings that are specified by the IDs assigned to the buttons on a main menu screen 600 illustrated in FIG. 8. The character strings are stored in association with IDs for every language-type that can be used. Upon receipt of an instruction to switch a language-type to another language-type specified through the operation unit 109, for example, the language data storage unit 230 reads the character strings corresponding to the IDs of the buttons on the main menu screen 600, and outputs the character strings on the display unit 220. In the present exemplary embodiment, the language data storage unit 230 stores each character string in Japanese, English, French, and Chinese. The character strings stored in the language data storage unit 230 (first character strings) are stored therein in advance before shipment.

The registration unit 240 registers the button names arranged on a screen displayed on the display unit 220 in different language-types. The button names are the character strings (second character string) displayed on the buttons registered according to instructions from a user. In other words, a button and its name can be determined by a user as desired through a registration screen which will be described. In the present exemplary embodiment, a shortcut button name of the Web browser 204 is registered. The registration unit 240 registers a shortcut button name, independently of the language data storage unit 230 that stores character strings in advance. The process to register a shortcut button name will be described in detail with reference to FIGS. 5 and 7.

A shortcut button name is registered in different displayable language-types as one file in the hard disk 106. The registration unit 240 stores setting values including a registered data ID, a default name, an English name, a Japanese name, a French name, a Chinese name, and remarks for each button name. For example, as in the case with the registered data 208 and 209, a default name of a shortcut button for the Web browser 204, button names in different language-types that can be displayed by the operation unit 109, and the URL assigned to the shortcut button are registered in association with one another. The default name is a character string displayed based on a predetermined rule. Default names in the present exemplary embodiment are sequential, such as WebAcess1 and WebAcess2. The default names may be any other character strings generated based on any predetermined rules. The default names are desirably expressed by a character code that will not make the names garbled in any switched language-type. In addition, the default names are desirably expressed in language-types (e.g., English) that can be generally understood by a user no matter which language-type the user speaks.

In the present exemplary embodiment, a shortcut button name is described as an example of a character string registered in association with an object. The same approach can be applied to a button name registered according to an instruction by a user using the application of Copy 201, Send 202, or Box 203. Character strings set as button names and parameters assigned to the buttons are differently set for different applications. When language-types used in the MFP are switched, the display switching unit 210 obtains a button name corresponding to the switched language-type from the registration unit 240, and displays the name on the operation unit 109.

A process to switch language-types in the present exemplary embodiment is described with reference to FIGS. 3 and 4.

Figure 3:
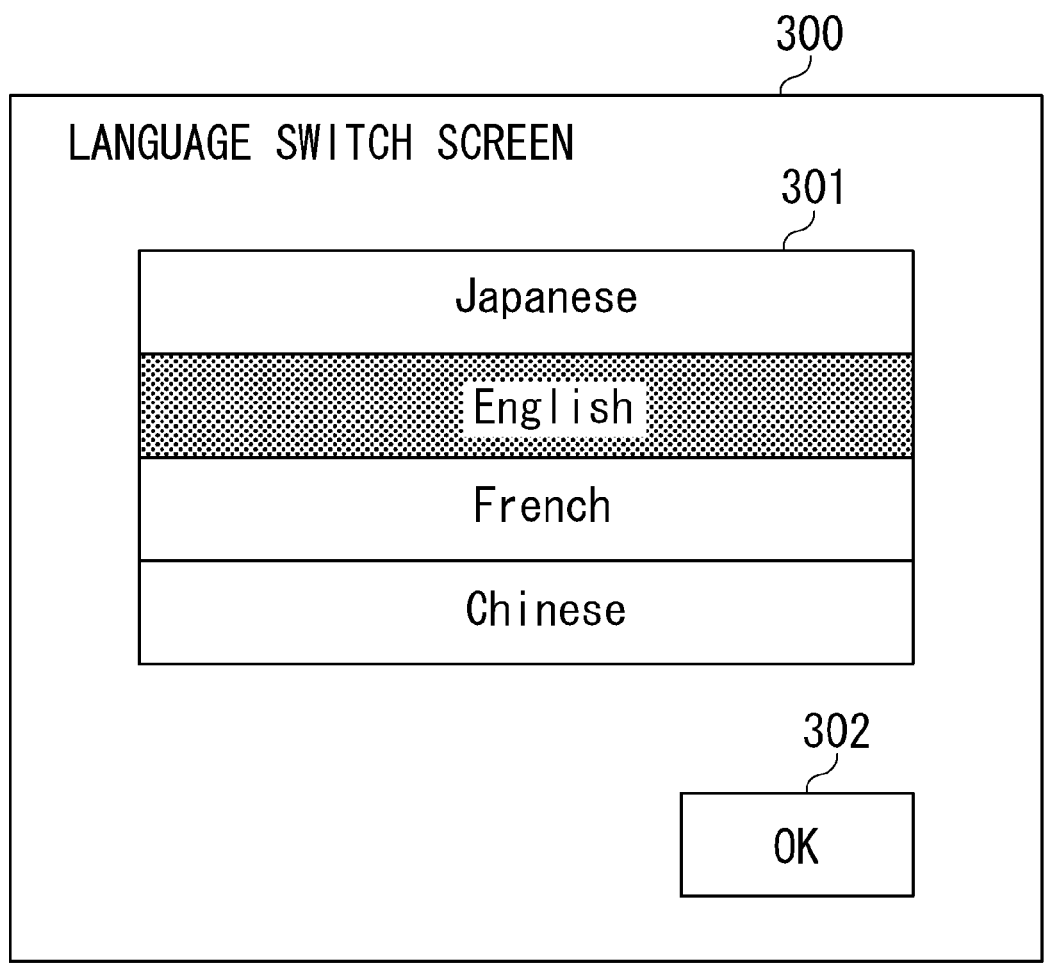
FIG. 3 illustrates a language-type switch screen.

FIG. 3 illustrates an example of a language-type switch screen. When a user instructs a switch of language-types through the operation unit 109, the display unit 220 displays a screen illustrated in FIG. 3 on the touch panel display of the operation unit 109.

A language-type switch screen 300 includes a language list 301 where language-types stored in the language data storage unit 230 are displayed. A user selects one from the displayed language-types, and presses the OK button 302. Upon pressing of the OK button 302, the language-type switching unit 210 performs the language-type switching process illustrated in FIG. 4.

Figure 4:
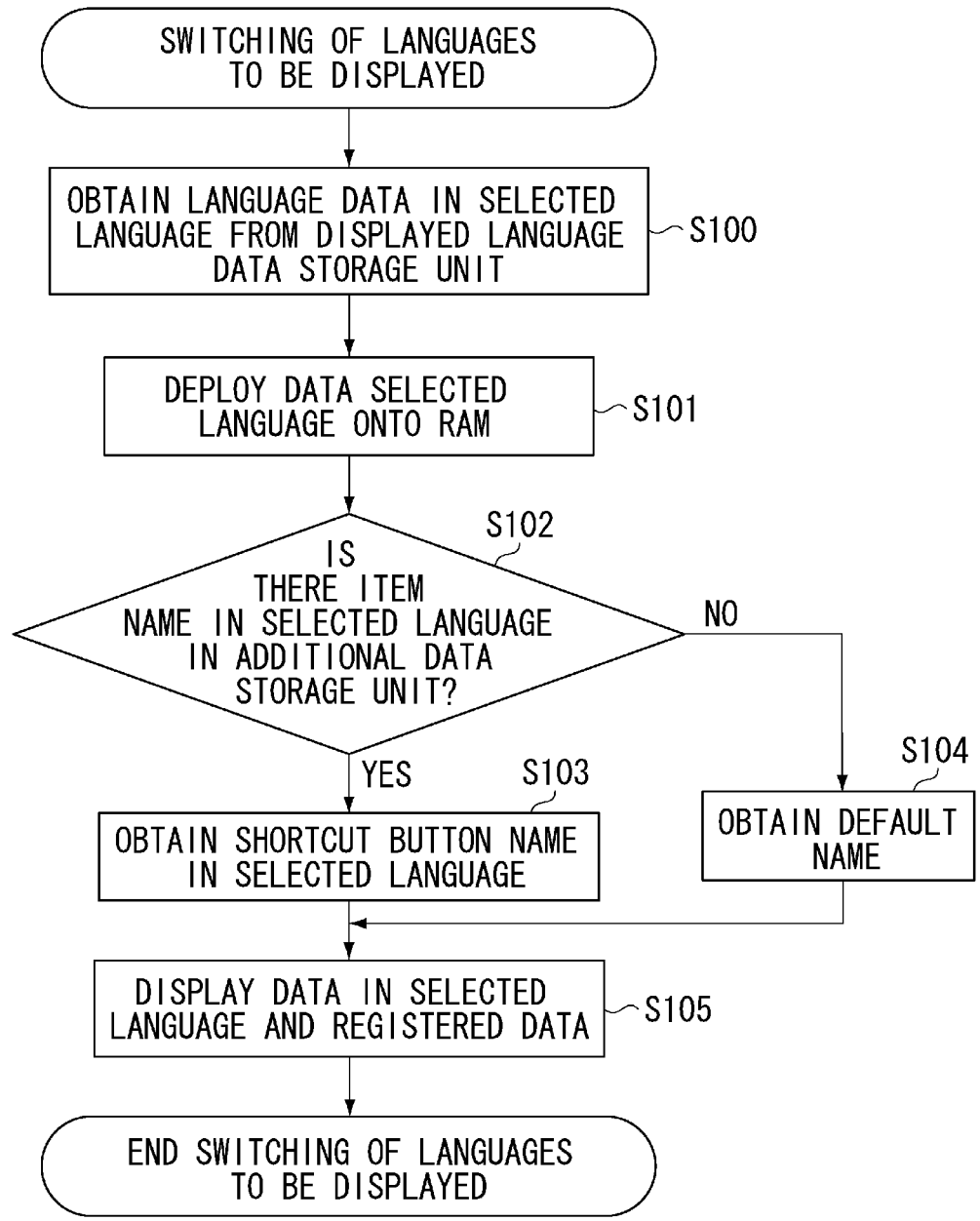
FIG. 4 is a flowchart illustrating a process to switch language-types.

FIG. 4 is a flowchart illustrating a process to switch language-types. The flowchart in FIG. 4 is comprised of steps that are implemented when the CPU executes a program stored in the ROM in the core unit 110. The flowchart in FIG. 4 starts when the OK button 392 is pressed on the screen in FIG. 3.

In step S100 (hereinafter, the expression "step" is omitted), the language-type switch unit 210 obtains a character string displayed in the language-type selected through the language-type switch screen 300 from the language data storage unit 230.

In S101, the language-type switch unit 210 deletes a character string that has been selected and stored in the RAM before the pressing of the OK button 302 in FIG. 3. The language switch unit 210 develops the character string obtained in S100 onto the RAM. For example, when "English" is selected through the language-type switch screen 300, a character string in English stored in the language data storage unit 230 is stored in the RAM.

In S102, the language switch unit 210 obtains a registered data ID in the registration unit 240. The language switch unit 210 then determines whether a shortcut button name corresponding to the registered data ID and expressed in the language-type specified through the language-type switch screen 300 is registered in the registration unit 240. If it is determined that there is a shortcut button name in the specified language-type (YES in S102), the process proceeds to S103, where the language switch unit 210 obtains the shortcut button name from the registration unit 240, and stores the name in the RAM. On the other hand, if it is determined that there is no shortcut button name in the specified language-type (NO in S102), the process proceeds to S104, where the language switch unit 210 obtains a default name corresponding to the obtained registered data ID from the registration unit 240. For example, in the case where "English" is selected through the language-type switch screen 300, and there exists a shortcut button name in English corresponding to the registered data ID "1", but no shortcut button name in English corresponding to the registered data ID "2", the language switch unit 210 obtains a default name "WebAcess2" as a character string for the registered data ID "2".

In S105, the display unit 220 displays the character string developed in S101 and the shortcut button name obtained in S102.

A process to register a shortcut button name into the registration unit 240 is described with reference to FIGS. 5 to 7.

Figure 5A:
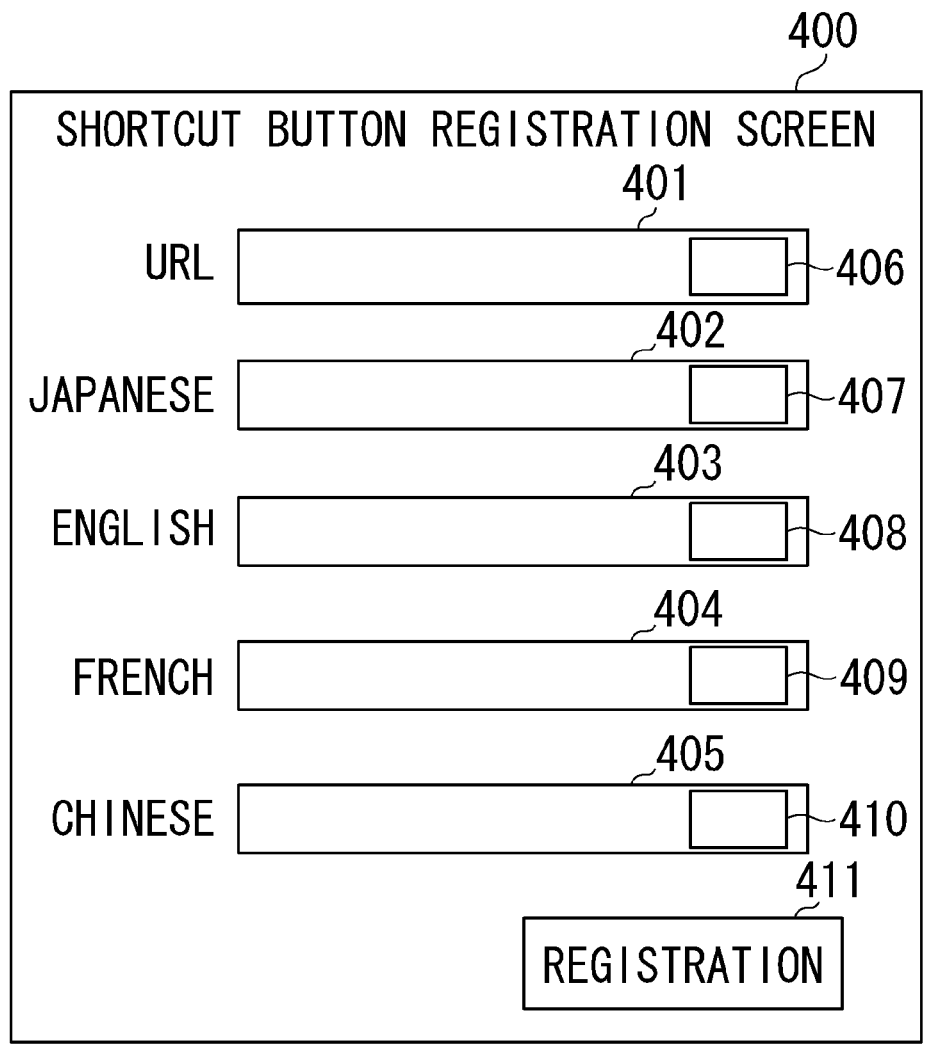
FIG. 5A illustrates a screen through which a user registers a shortcut button name.

FIG. 5A illustrates an example of a screen through which a shortcut button name is registered in the registration unit 240. In the present exemplary embodiment, FIG. 5A illustrates a screen by the Web browser 204 that is an application in the MFP 100, through which a shortcut button name is registered to access a specified website.

A URL entry field 401 accepts entry of a specified URL. The URL is registered in the registration unit 240 as a remark of the registered data 207. Entry fields 402 to 405 each accept an input of character string that can be displayed on the operation unit 109. The entry field 402, 403, 404, and 405 accept inputs of character strings in Japanese, English, French, and Chinese, respectively.

Figure 5B:
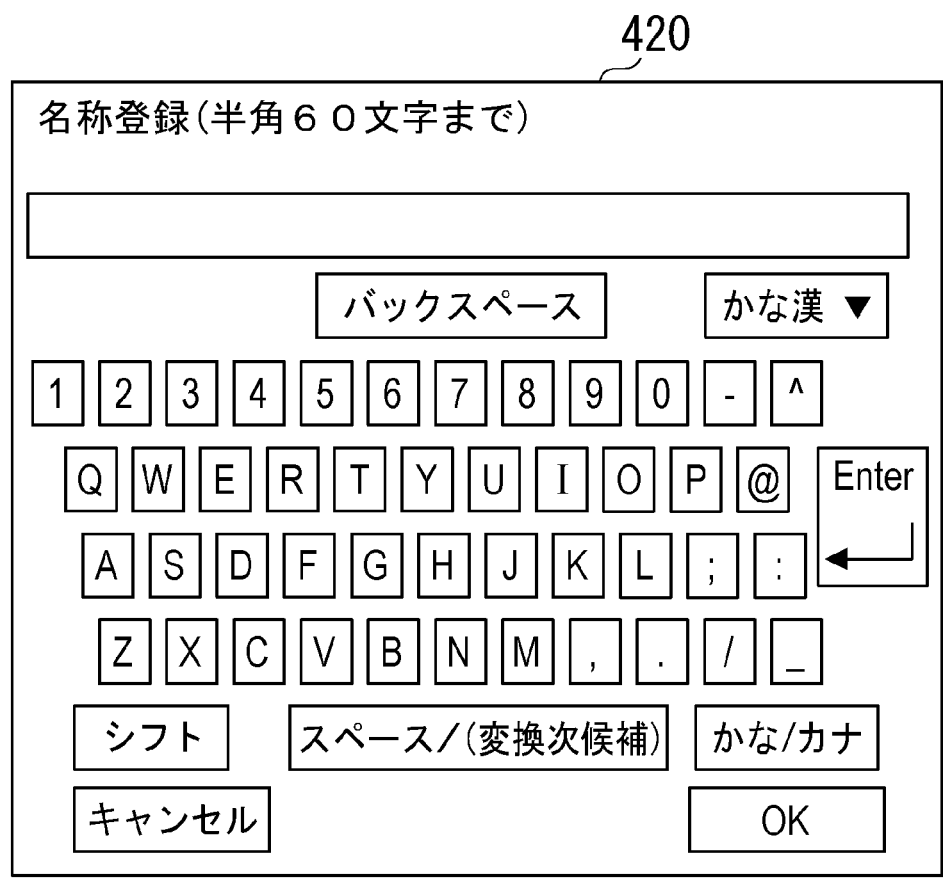
FIG. 5B illustrates a screen through which a user registers a shortcut button name.

Key board calling buttons 406 to 410 each call a key board screen such as that illustrated in FIG. 5B. The key board calling button 406, 407, 408, 409, and 410 are located in the entry field 402, 403, 404, and 405 respectively. When a user presses one of the key board calling buttons 406 to 410, the display unit 220 displays a key board screen such as that illustrated in FIG. 5B. The entry fields 402 to 405 are each accompanied with an information attribute that indicates a language (hereinafter, referred to as language information). When a key board is called, a key board screen corresponding to a specified language-type is displayed. For example, when a key board calling button 407 located in the Japanese entry field 402 is pressed, a key board screen in Japanese is displayed on the display unit because the Japanese entry field 402 is accompanied with Japanese language information. In the case of an entry field such as the URL entry field 401 that does not need language information, when a key board calling button is pressed, a key board screen is displayed corresponding to a language-type displayed at the time of the pressing of the key board calling button.

FIG. 5B illustrates a key board screen 420 that is displayed when the key board calling button 407 is pressed. The button 407 is located in the Japanese entry field 402 on the registration screen 400 in FIG. 5A.

When a user inputs a character string in an entry field as desired, and presses the registration button 411, the registration unit 240 registers a shortcut button name corresponding to the input character string. At the time of registration, the registration unit 240 registers a name unique to an application used as a default name that is generated according to a predetermined rule. The shortcut buttons in the present exemplary embodiment are used to access websites, and have sequential names such as WebAcess1 and WebAcess2.

Figure 6:
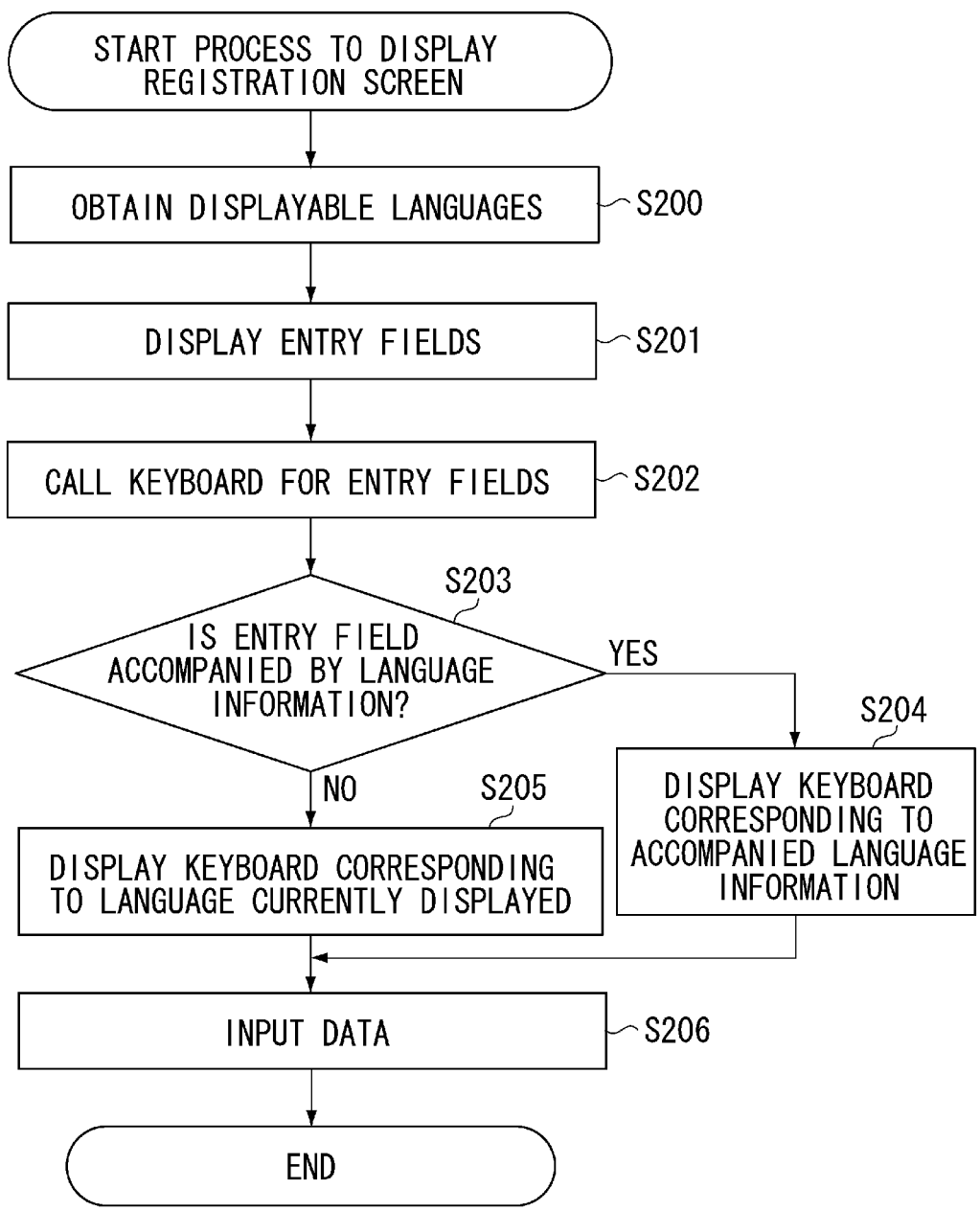
FIG. 6 is a flowchart illustrating a process to receive an input of a shortcut button name corresponding to a language-type that can be displayed on a screen.
Figure 7:
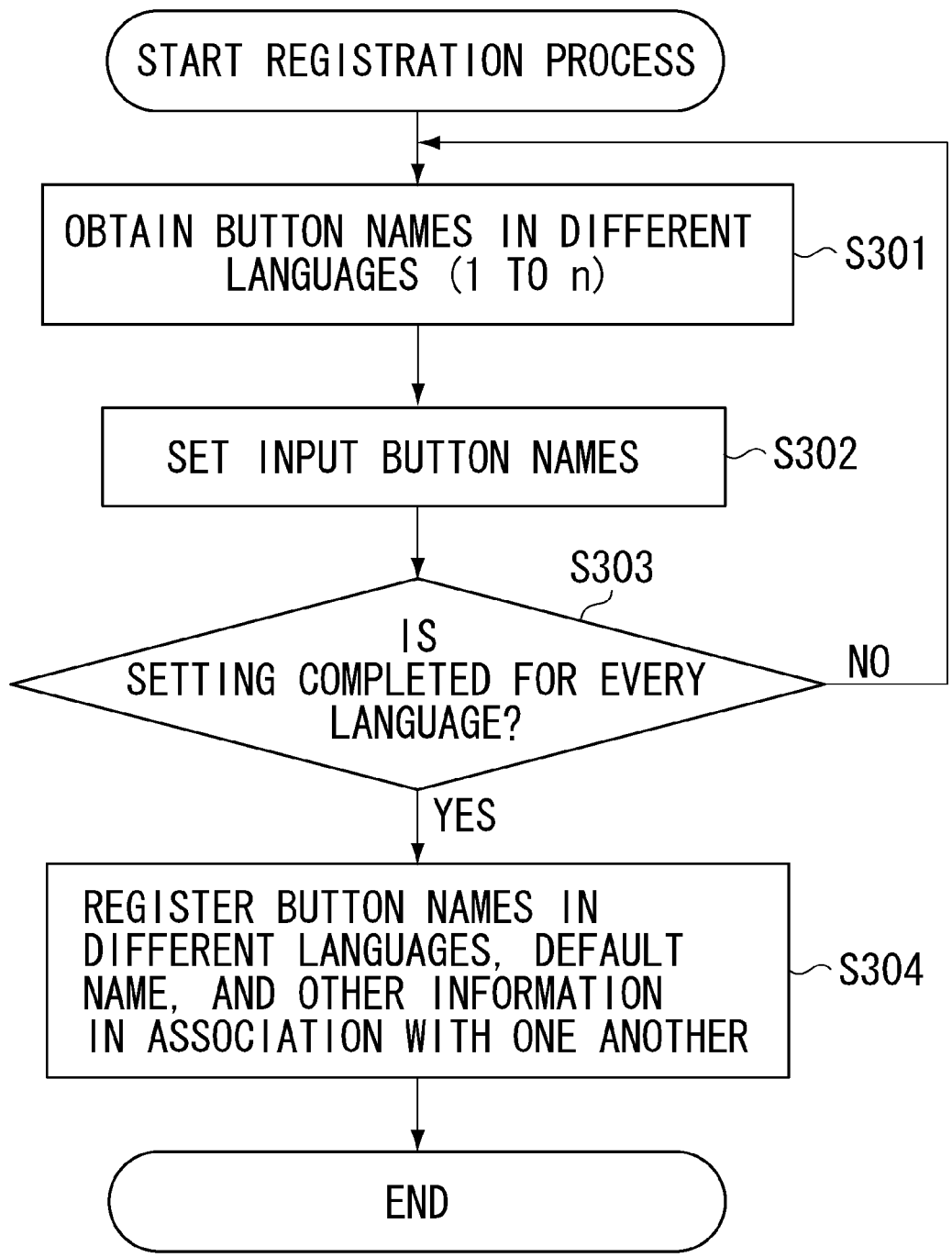
FIG. 7 is a flowchart illustrating a process to register a shortcut button name input by a user.

FIGS. 6 and 7 are flowcharts each illustrating a process to register a shortcut button name. The flowcharts in FIGS. 6 and 7 are each comprised of steps that are implemented when the CPU executes a program stored in the ROM in the core unit 110. The flowchart in FIG. 6 starts when a request for display of a registration screen is received from the Web browser 204.

In S200, the language switch unit 210 receives a request for display of a registration screen from the Web browser 204, and obtains language-types that can be displayed by the MFP 100 from the language data storage unit 230.

In S201, the display unit 220 displays the registration screen in FIG. 5A.

In S202, the display unit 220 detects a press down of the key board calling button 406, and makes a call to the language switch unit 210 for the keyboard in FIG. 5B.

In S203, the language-type switch unit 210 determines whether each entry field is accompanied with language information. If each entry field is accompanied with language information (YES in S203), in S204, the display unit 220 displays a key board screen corresponding to the accompanied language information. If each entry field is not accompanied with language information (NO in S203), in S205, the display unit 220 displays a key board screen in the same language-type as the current screen on the operation unit 109.

In S206, the display unit 220 reflects the contents input through the key board screen displayed in S204 or S205 to the entry fields of the registration screen 400.

FIG. 7 is a flowchart that starts when a press down of the registration button 411 on the registration screen 400 is received.

In S301, upon receipt of a press down of the registration button 411 from a user, the registration unit 240 obtains button names input to the entry fields 402 to 405.

In S302, the registration unit 240 sets the button names in the language-types obtained in S301 as shortcut button names corresponding to the language-types.

In S303, the registration unit 240 determines whether the setting of the shortcut button names in displayable languages is completed. If the settings are completed (YES in S303), the process proceeds to S304, where shortcut button names, default names, and URLs corresponding to displayable language-types are registered to the registration unit 240. If there exists an entry field with no input contents in the entry fields 402 to 405, no shortcut button name for the entry field is registered. If the settings are not completed (NO in S303), the process returns to S301.

Figure 8:
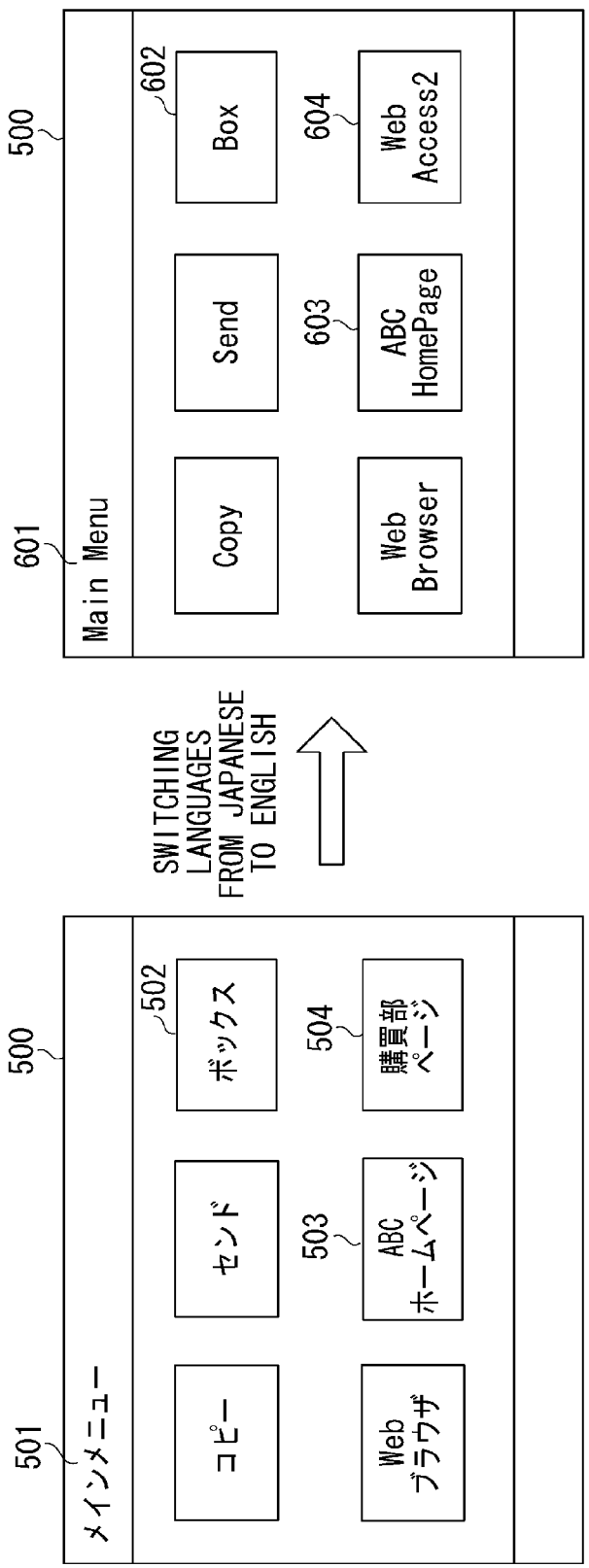
FIG. 8 illustrates a screen displayed for a process to switch language-types.

FIG. 8 illustrates a screen displayed on the operation unit 109 by the display unit 220 in a process to switch language-types in FIG. 4. FIG. 8 illustrates a case where the language-types are switched from Japanese to English in the language-type switching process. The main menu screen 500 is an initial screen of the MFP 100 when "Japanese" is selected through the language-type switch screen. The main menu screen 600 is an initial screen of the MFP 100 when "English" is selected through the language-type switch screen. The main menu screens 500 and 600 are each provided with buttons to call the applications for Copy 201, Send 202, Box 203, and Web browser 204. These buttons are displayed based on the character strings stored in the language data storage unit 220. The main menu screen 500 is further provided with shortcut buttons for browsers registered according to instructions from user through the registration screen 400. The shortcut buttons are each displayed with a button name registered through the registration unit 240. When one of the buttons is pressed down, a corresponding application is launched and displayed on the display unit 220. For example, when the Box button 502 is pressed down, the application for the Box 203 is activated, and the screen provided by the Box 203 is displayed.

The title 501 and the names of the buttons 502 corresponding to the applications are changed into the title 601 and the names of the buttons 602 respectively through the language switching process. The names of the buttons 503 and 504 that are separately added by user through the registration screen 400 are changed into the names of the buttons 603 and 604 respectively.

For the button 503, a Japanese button name and a English button name are registered through the registration screen 400, and thereby when the language-types are switched from Japanese to English, the English button name registered through the registration screen 400 is displayed as illustrated in the button 603. For the button 504, a Japanese button name is registered through the registration screen 400, but no English button name is registered (because a user did not input an English button name), and thereby when the language-types are switched from Japanese to English, a default name is displayed based on a predetermined rule as illustrated in the button name 604.

As described above, the present exemplary embodiment can accept a shortcut button name to access a registered Web page, according to desire of a user, in every language-type that can be displayed on a display unit of an MFP. As a result, the same button can be used in different language-types even at sites where users of different native language-types are working.

Furthermore, in the present exemplary embodiment, at the same time when the character string (first character string) stored in advance are switched into a specified language-type, the character string (second character string) registered according to instruction from a user is switched into the specified language-type. Accordingly, the possibility of garbled shortcut button names or no switching in language-type of the shortcut button names after language-type switching process is eliminated.

In addition, in the present exemplary embodiment, in the case where a user did not input a shortcut button name in a corresponding entry field at the time of registration of the shortcut button, no registration is made. In the language-type switching process, the entry field having no registration of shortcut button name in the specified language-type is displayed with a default name. As a result, shortcut button names are not necessarily input in every language-type, reducing need of operations of the user at the time of registration.

In the present exemplary embodiment, registration of a shortcut button to access a Web page using a Web browser has been described as an example of button registration. The present exemplary embodiment, however, is applicable to any applications other than Web browser. For example, in the case where a setting parameter that is often used in an application for Copy 201 is assigned and registered to a button (e.g., routine work button), a registration screen such as that illustrated in FIG. 5 may be displayed at the time of registration so that only a button name that can be displayed in different language-types is registered. In this case, instead of URL, a setting parameter that is often used in the application is registered in association with a button.

In the present exemplary embodiment, shortcut button names have been described as an example of character strings registered according to instruction from user. The present exemplary embodiment, however, is applicable also to any other character string that is registered according to instruction from user instead of button names Examples of the character strings include a message displayed on a screen and icons displayed with images.

The application for Box 203 accepts registration of a box name for a box freshly generated. At the time of registration, a box name is registered to a registration unit for each language-type that can be displayed by the MFP in association with one memory region, through a registration screen such as that illustrated in FIG. 5. The language-type switching process and the registration process are similarly performed, except in that parameters related to the box (e.g., information indicating storage location) are registered instead of URLs. Thus, box names can be switched in conjunction with a language-type switching process, even when the language-type switching process is performed for the entire MFP.

In the first exemplary embodiment, a user inputs a button name for each language-type through a screen. In a second exemplary embodiment, a shortcut button name of a website (the title of a Web page) is automatically obtained from a Web server 200, and the obtained shortcut button name is registered. The parts similar to those in the first exemplary embodiment are given with the same reference numerals, and will not be described.

Figure 9:
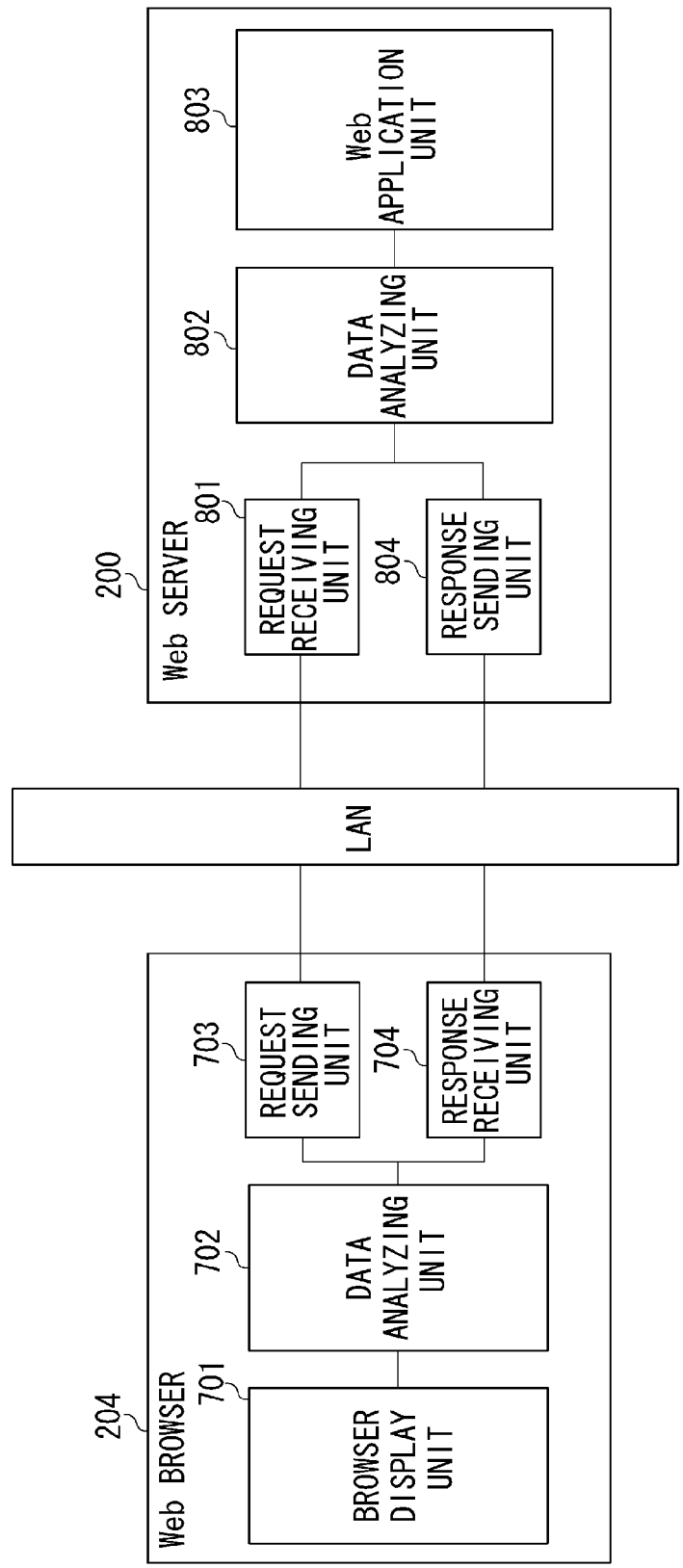
FIG. 9 is a block diagram illustrating a Web server and a Web browser.

FIG. 9 is a block diagram illustrating a Web browser 204 and a Web server 200.

The Web browser 204 includes a browser display unit 701, a data analyzing unit 702, a request sending unit 703, and a response receiving unit 704.

The browser display unit 701 displays a Web page on the operation unit 109, based on contents in HTML format received from the Web server 200.

The data analyzing unit 702 analyzes an instruction from the browser display unit 701, and sends the analysis result to the request sending unit 703. The data analyzing unit 702 analyzes information received from the Web server 200 as responses (hereinafter, also referred to as response information), and sends the analysis result to the browser display unit 701.

The request sending unit 703 sends the analyzed data to the Web server 200 as request information.

The response receiving unit 704 receives response information from the Web server 200, and transmits the information to the data analyzing unit 702.

The Web server 200 includes a request receiving unit 801, a data analyzing unit 802, a Web application unit 803, and a response sending unit 804.

The request receiving unit 801 receives request information from the Web browser 204, and transmits the information to the data analyzing unit 802.

The data analyzing unit 802 analyzes the received request information, and transmit the analyzed data to the Web application unit 803 to obtain information to be returned as response (response information).

The Web application unit 803 obtains and generates contents of a Web page to be displayed on the Web browser 204, and transmits the result to the data analyzing unit 802.

The response sending unit 804 transmits the contents to be displayed on the Web browser 204 with the response information, through the LAN 111 to the Web browser 204.

Figure 10A:
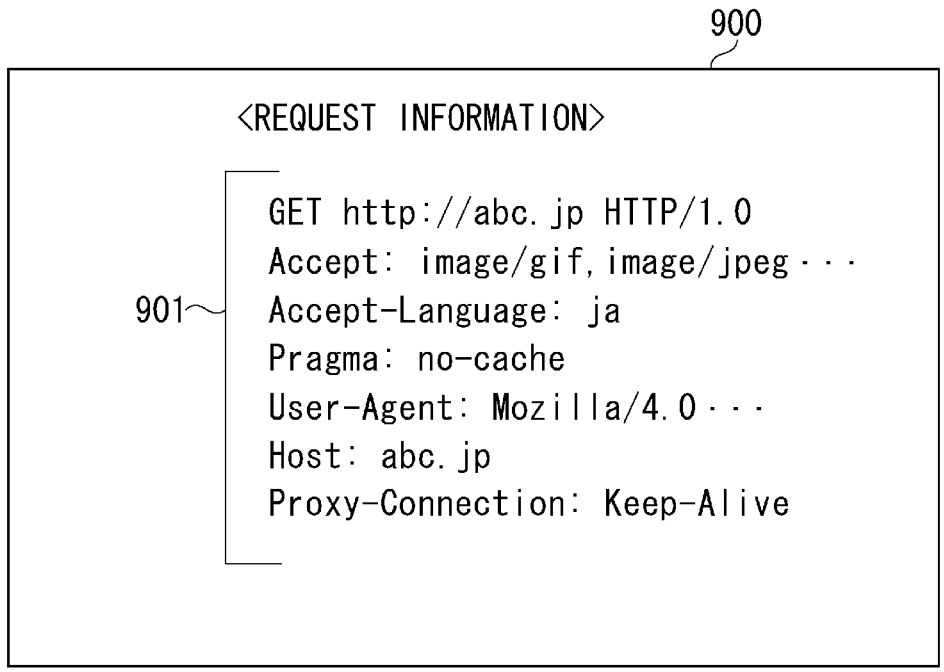
FIG. 10A illustrates an example of request information transmitted to a Web server from a Web browser and response information transmitted to a Web browser from a Web server.
Figure 10B:
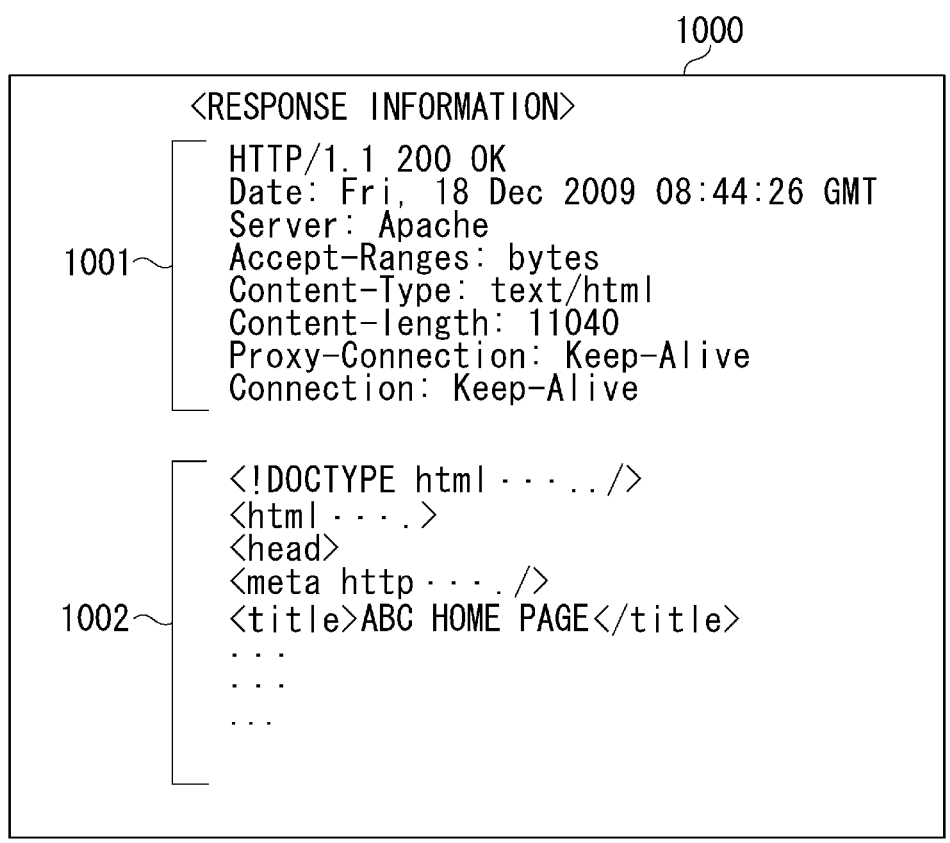
FIG. 10B illustrates an example of request information transmitted to a Web server from a Web browser and response information transmitted to a Web browser from a Web server.

FIGS. 10A and 10B illustrate request information 900 transmitted from the Web browser 204 to the Web server 200, and response information 1000 transmitted from the Web server 200 to the Web browser 204, respectively.

The request information 900 includes request header information 901.

The request header information 901 includes information about the ways to access, acceptable formats, and acceptable language-types. Among the information, "Accept-Language" is header information indicating a language-type that can be displayed by the Web browser 204, and usually contained in setting of the Web browser 204. In most cases, the Web server 200 transmits Web pages in the language-type corresponding to the Accept-Language to the Web browser 204, which is a client. In the case, however, where the Web server 200 does not have contents of Web pages in the language-type set as the Accept-Language, Web pages in default language-type are transmitted to the client.

The response information 1000 includes response header information 1001 and response body information 1002.

The response header information 1001 contains information indicating a result of confirming whether it responds correctly to request, server name, and response data size.

The response body information 1002 contains contents in HTML format that is displayed by the Web browser 204. Among the contents, the character string within the range from <title> to </title> is displayed at the title of a Web page by the Web browser 204. In the example illustrated in FIG. 10, the Web server 200 receives an input "ja" for the Accept-Language in the request header information 901, and transmits contents in Japanese as response information 1000, resulting in the Japanese title included as a character string in the response body information 1002. In the second exemplary embodiment, a character string for title contained in the received response body information 1002 is registered in the registration unit 240 as a shortcut button name.

Figure 11A:
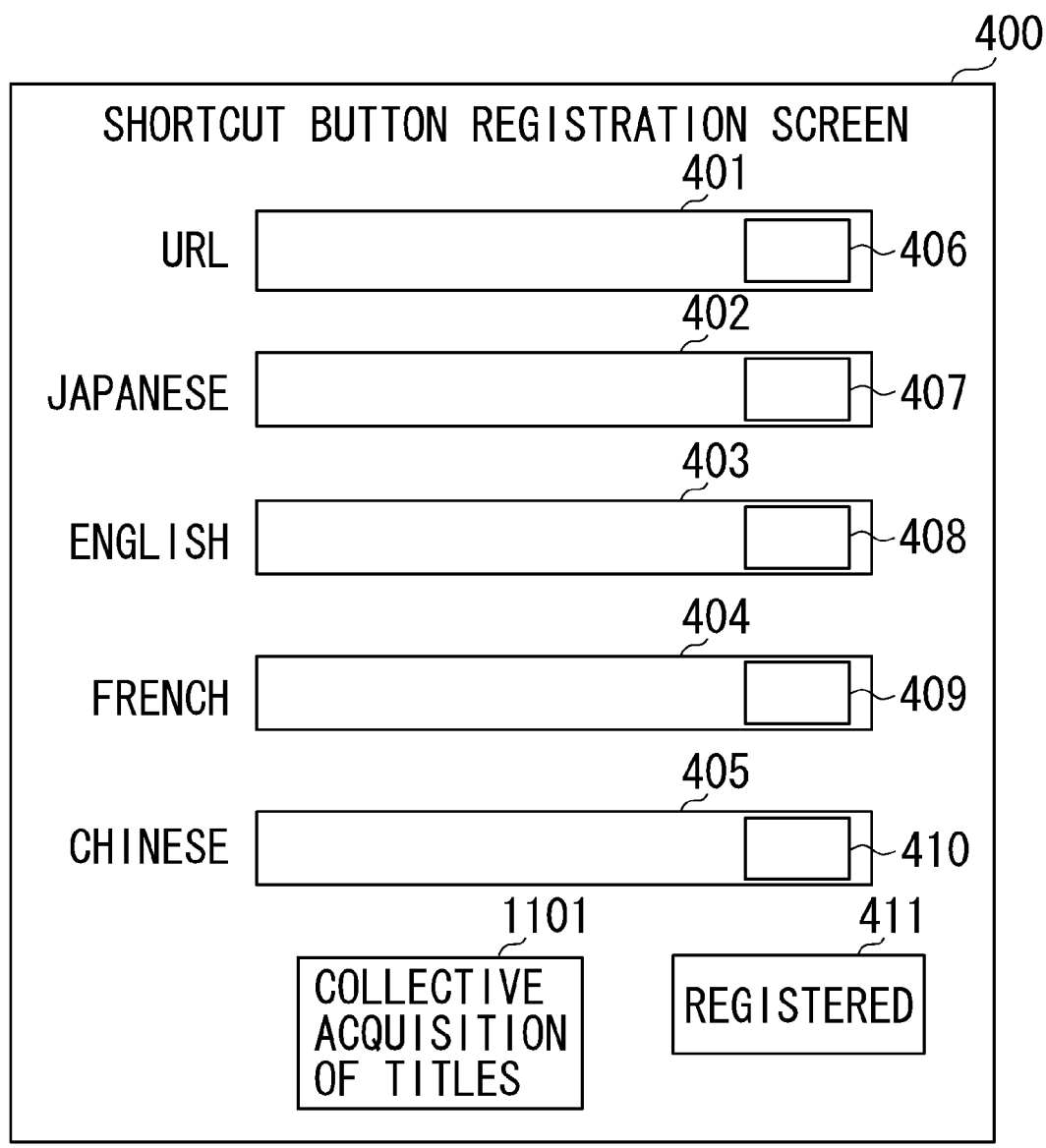
FIG. 11A illustrates a screen to register shortcut button names.
Figure 11B:
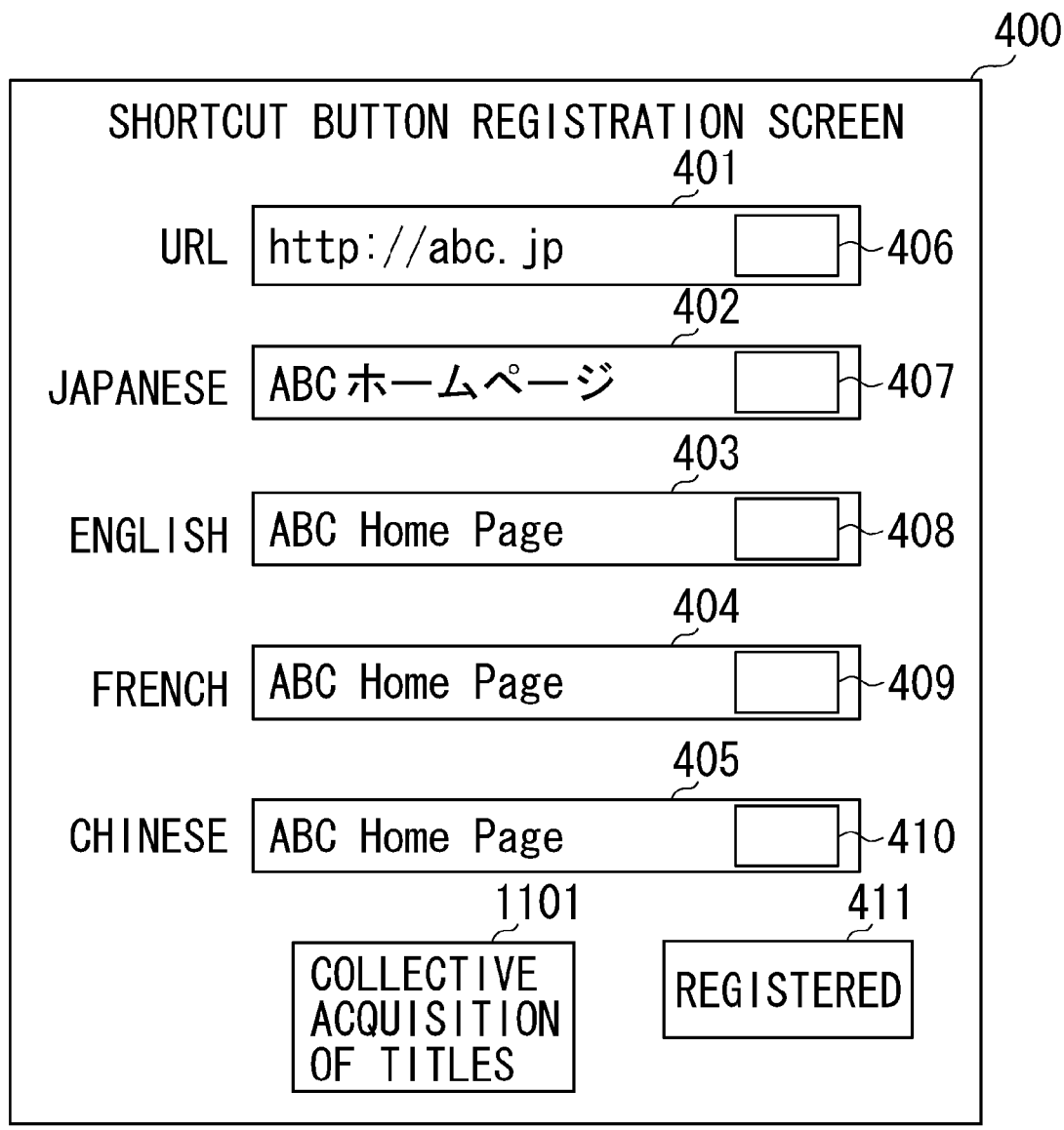
FIG. 11B illustrates a screen to register shortcut button names.

FIGS. 11A and 11B each illustrate a screen through which a title is automatically registered according to the second exemplary embodiment.

In FIG. 11A, the registration screen 400 is similar to that in FIG. 5 except in that a title collective acquisition button 1101 is provided.

When a user presses the title collective acquisition button 1101, the request information 900 is transmitted to the Web server of the URL input to the entry field 401. In the transmitted request information 900, the language information in the entry fields is set as Accept-Language of the request header information 901. More specifically, the entry fields each contain language information such as Japanese ja, English en, French fr, and Chinese zh-ch. If the title collective acquisition button 1101 is pressed without entry of URL to the URL entry field 401, automatic registration of a title cannot be achieved, and a warning screen is displayed to urge a user to input an URL.

Figure 13:
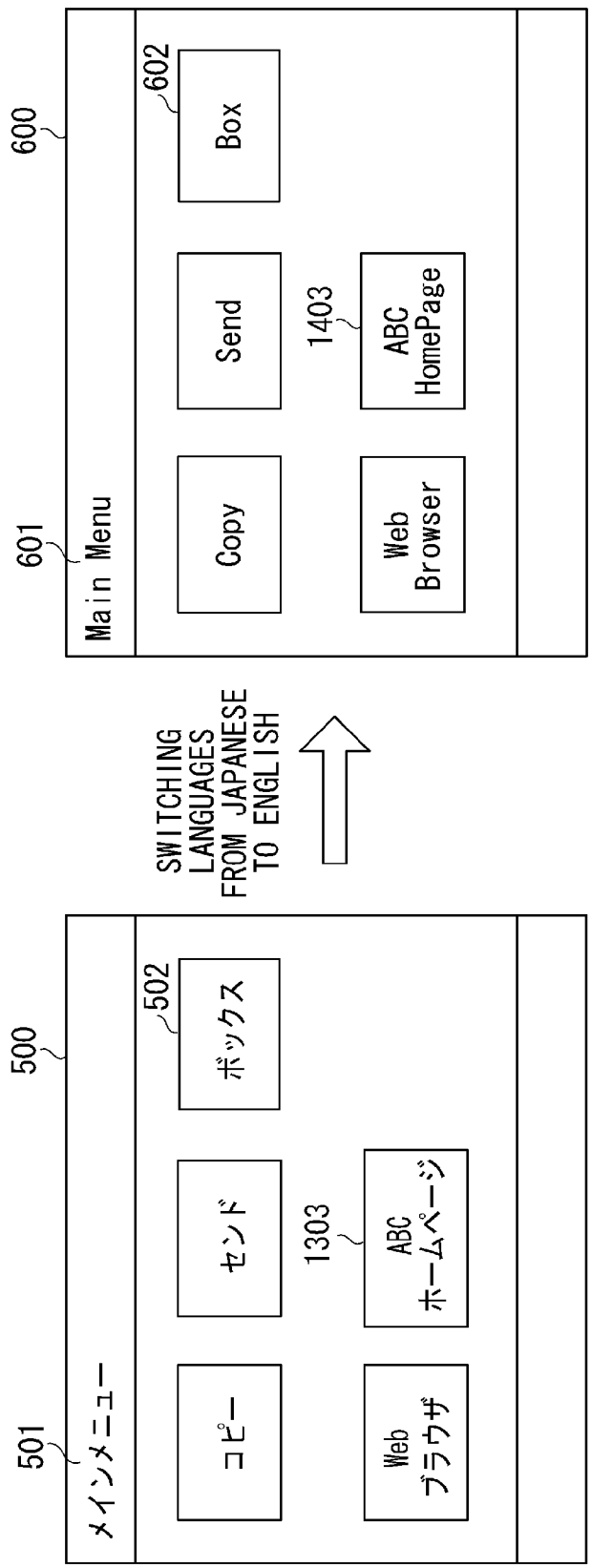
FIG. 13 illustrates screen displays in switched different languages.

The registration screen 400 in FIG. 11B is an example of a screen displayed after the title collective acquisition button 1101 is pressed. The entry fields each have information reflecting the character string (title) contained in the range from <title> to </title> in the response body information 1002 obtained from the Web server 200. In the present exemplary embodiment, the Japanese entry field 402 and the English entry field 403 each have a title in the specified language-type therein. In contrast, the French entry field 404 and the Chinese entry field 405 each have an English title therein. This is because the Web server does not have a Web page in French or Chinese. Thus, response information of the Web page in a default language-type (English in the present exemplary embodiment) is transmitted to the Web browser, resulting in the automatic entry of an English title into these entry fields. If there exists no Web page in the language-type specified as Accept-Language, names unique to the application used, such as WebAcess1 and WebAcess2, may be entered to the entry field. In the screen in FIG. 11B, a Japanese button name is correctly displayed in the Japanese entry field 402. The button name in the entry field 402, however, may be garbled when displayed. In this case also, the button name is correctly displayed through a language-type switching process using the operation screen such as those in FIG. 8 and FIG. 13.

By pressing the registration button 411, the titles input to entry fields are registered in the registration unit 240 as shortcut button names.

The titles input to entry fields by press down of the title collective acquisition button 1101 are editable by a user through the key board screen 420 that is called using one of key board calling buttons 407 to 410.

In the present exemplary embodiment, the title collective acquisition button 1101 is provided separate from the registration button 411, but the other configuration may be used in which titles are automatically obtained to be registered in the registration unit 240 when the registration button 411 is pressed.

Figure 12:
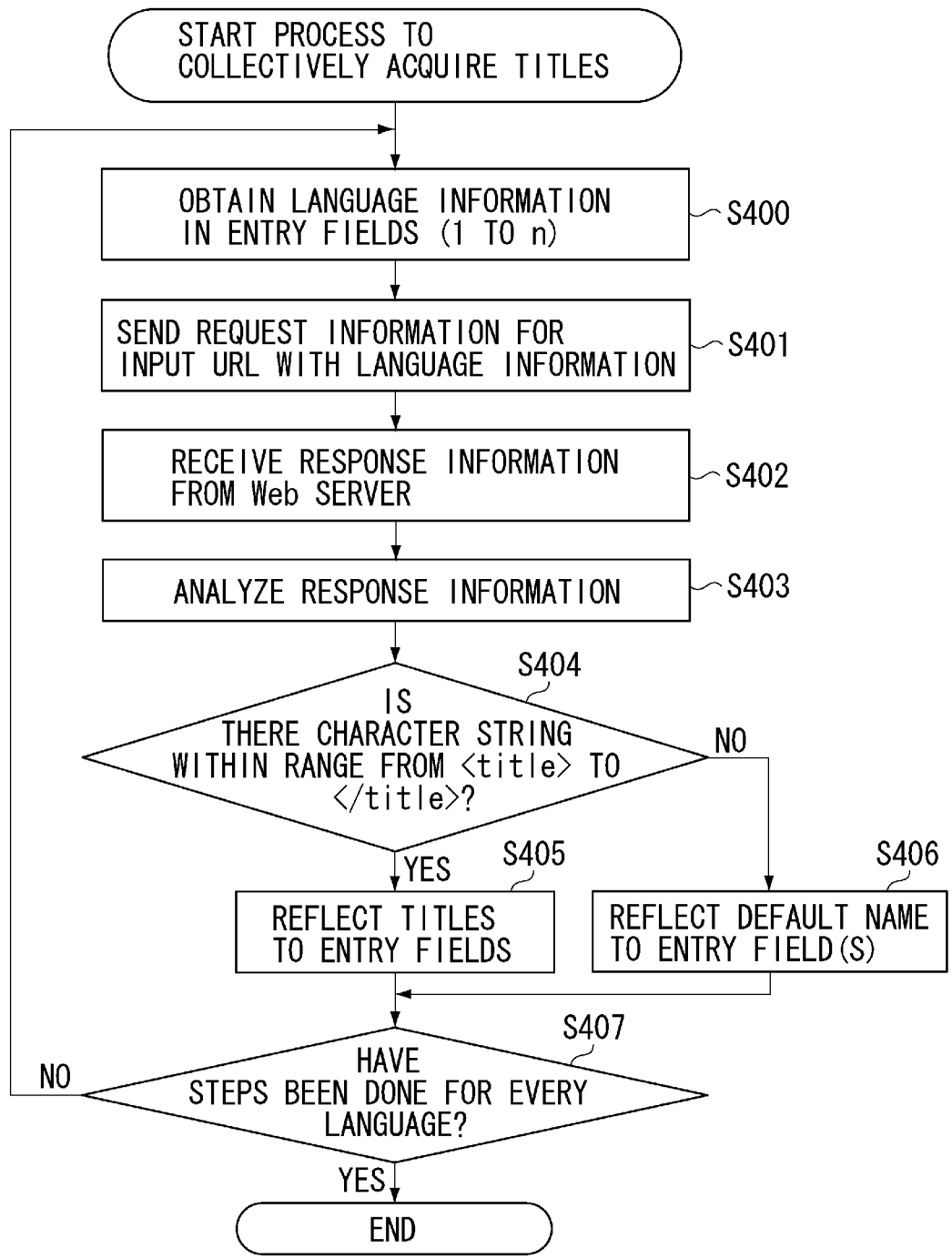
FIG. 12 is a flowchart illustrating a process to obtain shortcut button names at one time in different language-types.

FIG. 12 is a flowchart illustrating steps performed when the title collective acquisition button 1101 on the registration screen 400 is pressed. FIG. 12 is comprised of steps that are implemented when the CPU executes a program stored in the hard disk 106.

In S400, the data analyzing unit 702 obtains language information input to the entry fields 402 to 405 displayed on the registration screen 400.

In S401, the request sending unit 703 sets the Accept-Languages of the request information 900 to the language information obtained in S400. The request sending unit 703 then transmits the request information 900 to the URL input to the entry field sequentially one by one in the obtained different language-types. The transmitted request information 900 is received at the request receiving unit 801 of the Web server 200, analyzed at the data analyzing unit 802, and the resultant data is sent to the Web application unit 803 for interpretation.

In S402, the response receiving unit 704 receives response information 1000 output in response to the request information 900 from the Web browser 204 in S401, from the Web server 200.

In S403, the data analyzing unit 702 analyzes the response information 1000 received in S402.

In S404, the data analyzing unit 702 determines whether there exists a character string (title) within the range from <title> to </title> among the response information analyzed in S403. If there exists a title within the range from <title> to </title> (YES in S404), the process proceeds to S405, where the display unit 220 reflects the obtained title to an entry field for a corresponding language-type, and displays the title in the corresponding language-type on the registration screen 400. If there exists no title (NO in S404), the process proceeds to S406, where the display unit 220 reflects a default name to the entry field.

In S407, it is determined whether or not the information requesting for the names of the entry fields to be obtained is entirely transmitted. If there remains a name of an entry field to be obtained (NO in S407), the Accept-Language is set to another language-type, and the process returns to S401. If the request information is entirely transmitted (YES in S407), the title collectively acquisition process ends.

FIGS. 13A and 13B each illustrate a screen displayed on the display unit 220 through a language-type switching process after registration through the registration screen 400. As in FIG. 8, the title 501 and buttons 502 that are button names located in the main menu screen 500 are switched to the title 601 and buttons 602 in the main menu screen 600 respectively.

The Japanese button 1303 registered by the title collectively acquisition process is also switched to the English button 1403.

As described in the second exemplary embodiment, if a user is reluctant to input button names in each displayable language-type, the user can collectively obtain the title of a Web page from a Web server in displayable language-types, and the obtained titles can be registered as shortcut button names. As a result, operations a user needs to do can be reduced. Such titles of a Web page can be used through one shortcut button for corporate intranet pages in an environment where users of different native language-types access the pages, providing button names in different language-types the users individually understand.

In the second exemplary embodiment, the flowchart in FIG. 12 starts upon pressing of the title collective acquisition button 1101. The flowchart in FIG. 12, however, may start when a Web browser first accesses the URL assigned to a shortcut button.

An information processing apparatus according to the present invention may be configured to select and execute the process illustrated in the first exemplary embodiment or the process illustrated in the second exemplary embodiment. More specifically, an information processing apparatus may be configured to inquire a user, when requesting registration of a button, whether the user registers a shortcut button name by manual input or based on a title automatically acquired from a Web server. According to the response from the user, the information processing apparatus selects a screen to be displayed between FIG. 5A and FIG. 11A. As a result, if the user is reluctant to input manually button names in each displayable language-type, a collective registration can be achieved based on the titles collectively acquired from the Web server, while if the user wants to input button names as it desires, names manually input by the user are registered.

Furthermore, any name in a language-type that is not input by the user through the registration screen 400 can be set to the title obtained from the Web server.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-154957 filed Jul. 7, 2010, which is hereby incorporated by reference herein in its entirety.

The invention claimed is:

1. An information processing apparatus, comprising:
a display unit configured to display a menu screen, the menu screen being able to be used for switching of displayed languages;
an input unit configured to prompt a user to input, via a registration screen, a registration instruction for registering in the menu screen a user-defined button which is defined by a user, the user-defined button enables a process to be performed by the information processing apparatus and allows the user to define a plurality of button names, each of the plurality of button names corresponding to a different one of the displayed languages for the user-defined button; and
a storage unit configured to store the plurality of button names for the user-defined button in response to the registration instruction;
wherein the input unit is configured to input a switching instruction for switching the displayed languages, the switching instruction indicating a displayed language that is selected from the displayed languages and,
wherein the display unit is configured to display, in response to the switching instruction, a button name for the button in the menu screen, the user-defined button name corresponding to the selected displayed language.

2. The information processing apparatus according to claim 1, wherein the user-defined button is a shortcut button assigned with a URL to access a website.

3. The information processing apparatus according to claim 1, wherein the button name is a character string input by the user, as a name of the user-defined button.

4. The information processing apparatus according to claim 3, wherein the button name is a character string generated based on a predetermined rule as a name of the user-defined button when the character string is not registered by the user.

5. The information processing apparatus according to claim 3, wherein the character string is a name of a shortcut button used to access a specified website.

6. The information processing apparatus according to claim 5, further comprising a Web browser that sends a request to access a Web page specified by a URL assigned to the shortcut button and that receives a response to the sent request,
wherein the storage unit stores a title of the Web page contained in the response received by the Web browser, as a name of the shortcut button.

7. The information processing apparatus according to claim 6, wherein the Web browser sends language information indicating a language-type to be displayed together with the request, and receives a response containing a title of a Web page corresponding to the language information.

8. The information processing apparatus according to claim 7, wherein the storage unit stores a title of a Web page corresponding to a predetermined language information when the Web browser did not acquire the title of the Web page corresponding to the language information.

9. A method of controlling an information processing apparatus, comprising:
displaying a menu screen using a display unit, the menu screen being able to be used for switching of displayed languages;
prompting a user to input, via a registration screen of an input unit, a registration instruction for registering in the menu screen a user-defined button which is defined by a user, the user defined button enables a process to be performed by the information processing apparatus and allows the user to define a plurality of button names, each of the plurality of button names corresponding to a different one of the displayed languages for the user-defined button;
storing the plurality of button names for the user-defined button in response to the registration instruction;
inputting a switching instruction for switching the displayed languages, the switching instruction indicating a displayed language that is selected from the displayed languages; and
in response to the switching instruction, displaying, via the display unit, a button name for the user-defined button in the menu screen, the button name corresponding to the selected displayed language.

10. A non-transitory storage medium storing a computer readable instructions that, when executed by one or more processors, implements a method of controlling an information processing apparatus, the method comprising
displaying a menu screen using a display unit, the menu screen being able to be used for switching of displayed languages;
prompting a user to input, via a registration screen of an input unit, a registration instruction for registering in the menu screen a user-defined button which is defined by a user, the user defined button enables a process to be performed by the information processing apparatus and allows the user to define a plurality of button names, each of the plurality of button names corresponding to a different one of the displayed languages for the user-defined button;
storing the plurality of button names for the user-defined button in response to the registration instruction;
inputting a switching instruction for switching the displayed languages, the switching instruction indicating a displayed language that is selected from the displayed languages; and
in response to the switching instruction, displaying, via the display unit, a button name for the user-defined button in the menu screen, the button name corresponding to the selected displayed language.

* * * * *